3,324,454
VEHICLE BRAKE LIGHT SIGNAL DEVICE
Joseph Haratani, 6417 Lyric Lane,
Falls Church, Va. 22044
Filed Oct. 6, 1965, Ser. No. 493,513
13 Claims. (Cl. 340—71)

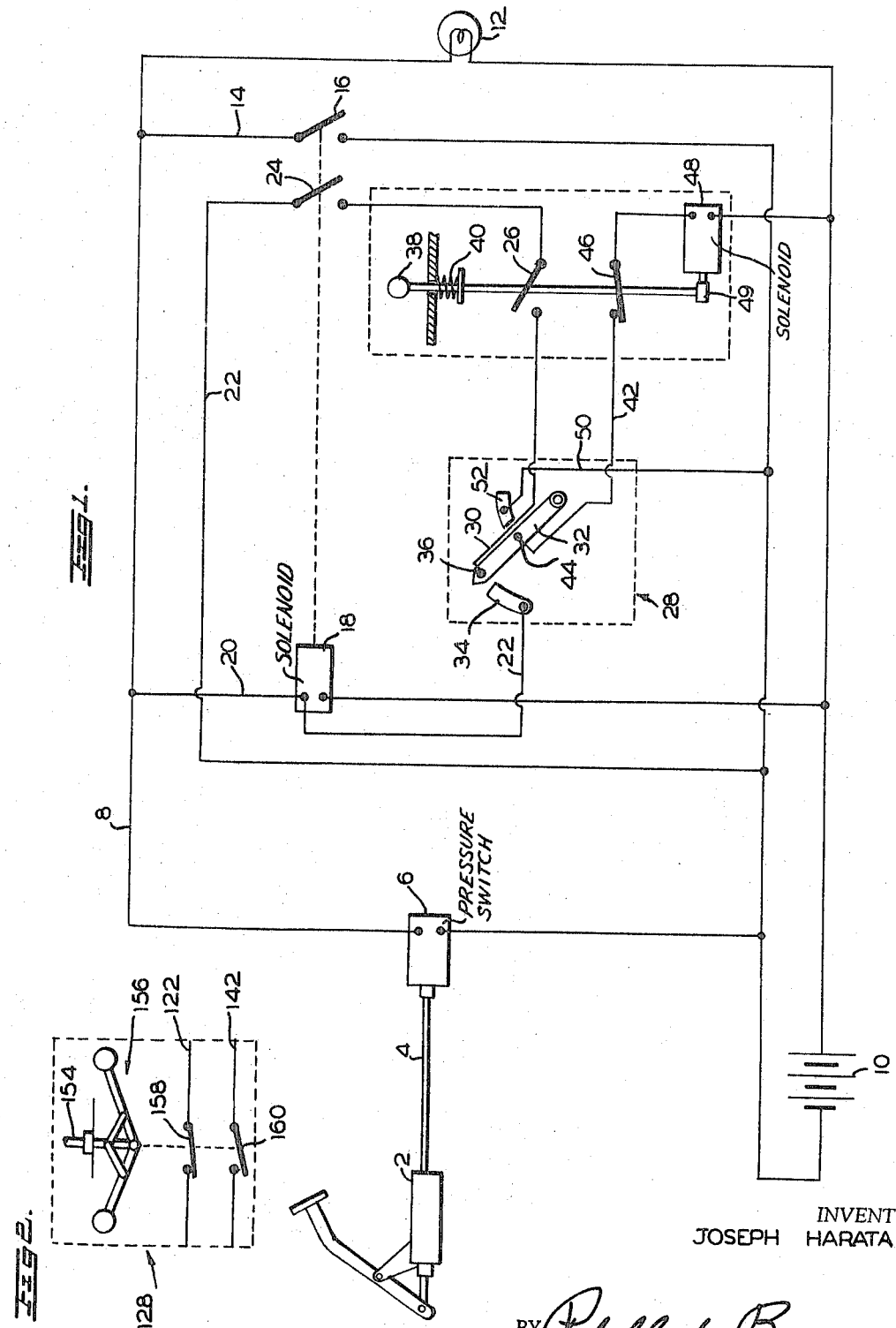

This invention relates generally to vehicular signaling devices and more particularly to a signaling device for use in conjunction with vehicular brakes to indicate a slowed or stopped condition of the vehicle.

In contemporary expressway vehicular travel, many of the prior art vehicular signaling systems are somewhat outmoded or unsuitable for the high speed traffic conditions encountered. At the high speeds traveled it is necessary, in some cases, to give more positive indications of vehicle speed conditions in order to provide sufficient reaction time to permit following vehicles to stop or avoid slow moving or stopped vehicles on the road.

Although the present art brake light systems provide sufficient indication of a braking condition in a vehicle, once pressure is removed from the brake system there is no further indication of a stopped or slowed vehicle condition to warn other vehicles approaching from the rear.

It is an object of this invention to provide a signal system for vehicles which avoids the above disadvantages by furnishing a continuing indication, when vehicle brakes are applied, of a stopped condition or slow-moving condition of that vehicle.

It is another object of this invention to provide a signal actuated by the brake system of a vehicle which retains the brake lights in an energized condition until the speed of the vehicle approaches that of normal expressway operation.

It is still another object of this invention to provide a means to de-energize the above-referred to signal system for non-expressway, slow-moving vehicle operation, which means is automatically de-activated when expressway operation is resumed.

These and other objects of the invention will become better understood to those skilled in the art by reference to the following detailed description when viewed in light of the accompanying drawing wherein:

FIGURE 1 is a schematic representation of a signal device embodying features in accordance with this invention and:

FIGURE 2 is a schematic representation of a variation in a portion of the device in FIGURE 1.

In FIGURE 1, a vehicular signal system in accordance with the invention is illustrated and includes a vehicular brake and master cylinder 2 connected, through a hydraulic line 4, to a pressure switch 6. The above-described components are standard in the art, the pressure switch operating to a closed condition when hydraulic pressure is increased by actuation of the vehicular braking system. A brake light circuit 8, connected to a battery 10, or other source of electrical power, includes a brake light 12 which is energized when the brake light switch 6 is closed during braking of the vehicle. A bypass circuit 14 is connected to the battery 10 and the brake light circuit 8 to bypass the pressure switch 6 for purposes to be described below. A normally open switch 16 operated by a solenoid 18 controls the flow of electrical current through the bypass circuit 14.

A first solenoid operating circuit 20 connects the solenoid 18 across the brake light circuit 8 to provide energization thereof for closing of the switch 16 when the pressure switch 6 is closed. A second solenoid actuating circuit 22 connects the solenoid 18 to the battery 10 independently of the first solenoid actuating circuit 20. The second circuit 22 includes a normally open switch 24 actuated by the solenoid 18, a lockout switch 26 and a vehicle speed-condition operated switch indicated generally at 28. Although this latter-mentioned switch is specifically shown incorporated in a vehicle speedometer system, it should be understood that speed-sensing switches such as centrifugal switches in the vehicle speedometer cable or other rotating portion thereof, or switches incorporated in manual or automatic transmissions which will be operated according to the speed condition or transmission configuration of the vehicle could be substituted for the specific switch shown. For this reason, the term vehicle speed-condition actuated or operated switch as opposed to vehicle speed operated switch is used herein. In this manner, switches operated by the configuration or movement of the transmission elements are also included in the intended definition of this term.

In the speedometer switch embodiment illustrated, the vehicle speed-condition operated switch comprises a brush or contact 36 mounted on a speedometer indicator 32. A first arcuate contact band 34 is disposed in the arcuate sweep of the first brush 36. The brush 36 is connected to a conductor 30 and, when the vehicle speed is such that the indicator 32 is in the range of the contact band 34, electrical connection is made through the switch. The disposition and range of the band 34 preferably corresponds to low vehicle speeds such, for example, as 30 miles per hour and below.

The lockout switch 26 is manually operated through a pull rod 38 which is biased by a spring 40 toward a closed position. A lockout switch de-activating circuit 42 is connected to a second contact or brush 44 on the speedometer indicator 32 and, through a pull rod actuated switch 46 to a pull rod release solenoid 48. A pull rod blocking member 49, spring biased toward the path of the pull rod, is connected to the armature of the solenoid 48. The lockout switch de-activating circuit 42 is connected to one side of the battery 10 on one side of the solenoid 48 and is connectable with the other side of battery 10 through a conductor 50 and a second contact band 52 disposed to engage the brush 44 when the speedometer indicator 32 passes thereover. The band 52 is preferably disposed so that the brush 44 makes contact therewith when the vehicle speed has increased to a point beyond the normal speed range encountered in city driving such, for example, as 50 miles an hour and above. As in the case of the speed-condition operated switch described above, a centrifugal switch connected to a rotating member of the vehicle or transmission actuated switches may be substituted for the speedometer switch specifically illustrated without exceeding the scope of the invention.

In operation of the device, assuming that the car is at a speed above the span of the band 34 and the lockout switch 26 is closed, as the brakes are applied the pressure switch 6 is closed and the brake light circuit 8 is energized so that the brake light 12 signals a braking condition for the vehicle. In this condition, current also flows through the first solenoid energizing circuit 20 actuating the solenoid 18 and closing the switches 16 and 24. When the brakes are released, the pressure switch 6 is opened and, assuming that the vehicle speed after braking is still above a speed equivalent to the span of the contact band 34, the circuits 8 and 20 are deenergized. Since the second solenoid actuating circuit 22 is open, because the brush 36 is above the range of the contact band 34, the solenoid 18 will be de-energized and switches 16 and 24 will open and the brake light 12 will be extinguished in the normal manner.

Assuming now that, at or after application of the brakes, the vehicle speed is below a range equivalent to the span of the contact band 34. The brush 36 will now be in contact with the band 34 to complete the circuit 22 so that, in this condition, although the opening of the pressure switch 6 will de-activate the circuits 8 and 20 upon release of the brakes, the brake light 12 will remain energized through the bypass circuit 14 since the solenoid 18 is still actuated by the second solenoid actuating circuit 22 through the contact between the brush 36 and the band 34. This condition will persist and the brake lights will remain energized as a warning signal until the vehicle speed has increased to a point where the speedometer indicator 32 has passed the range of the contact band 34 and the brush 36 breaks contact with the band 34 deenergizing the solenoid 18 thereby opening the switch 16 and de-energizing the brake light 12.

In the above manner the deviec functions to maintain a warning signal, through the brake light 12, to indicate a slow-moving or stopped vehicle in expressway operation. When the slowed or stopped vehicle increases its speed to that approaching a safe expressway operating speed, the warning signal is automatically de-energized through the operation of the vehicle speed-condition operated switch 28.

For operation under circumstances other than expressway or high speed conditions, it is desirable to de-activate the warning system to avoid a continuous signal during slow moving or city operation. For these purposes, the manually operated lockout switch 26 is utilized which, when opened, de-activates the second solenoid actuating circuit thereby providing normal operation of the brake light 12 when so desired. Although a simple dashboard mounted manual off-on switch may be suitable for this purpose, it is preferred that means be provided for automatically closing the switch when expressway speed conditions are reached in the event the operator neglects to reset the switch. This means is incorporated in the lockout switch de-activating circuit 42 and operates as follows. When the device is to be de-activated, for slow driving conditions, the operator pulls the pull rod 38 against the bias of the spring 40 and, when the lower portion of the pull rod 38 has cleared the solenoid 48, the member 49 moves into the path of the pull rod to block return thereof. The motion of the pull rod also opens the switch 26 and closes the switch 46 in the lockout switch de-activating circuit. While the vehicle speed is below that equivalent to the span of the second contact band 52, the lockout switch de-activator circuit 42 remains open. When the vehicle speed increases to that equivalent to the span of the contact band 52, contact is closed between the second brush 44 and the second contact band 52 and the solenoid 48 is energized withdrawing the member 49 from the path of the pull rod 38. The pull rod then returns to its original position under the influence of the spring 40, opening the switch 46 while closing the switch 26 to thereby reactivate the first solenoid actuating circuit 22. The warning device is thereby automatically reactivated at expressway speeds without requiring further attention from the vehicle operator.

Suitable panel mounted indication lights may be incorporated to show the condition of the various circuits of the device as desired or required. For example, a signal light (not shown) may be incorporated in the second solenoid actuation circuit to indicate continued energization of the brake light after the brake pedal has been released. A signal circuit could also be associated with the pull rod 38 to indicate deactivation of the device.

A special signal of a slowed or stopped non-braking condition may be provided by incorporating a flasher device (not shown) of any type known in the art in the bypass circuit 14. This flasher would cause the brake lights to flash when the brake light 12 is energized by the circuit 14 alone.

In the modification of the speed condition, sensing switch shown in FIGURE 2 of the drawing, the components thereof corresponding to similar components of the embodiment of FIGURE 1 are indicated by like numerals only of the next higher series. The speed-condition operated switch 128 comprises a rotating shaft 154, attached to some rotating portion of the vehicle such, for example, as the speedometer cable (not shown). The shaft 154 is connected to a rotating weight governor shown generally at 156 to provide rotation therefore according to the speed of the vehicle. The governor 156, is, in turn, connected to switches 158 and 160 in a second solenoid actuating circuit 122 and a lockout switch de-activating circuit 142 respectively. The governor 156 is biased so that the switch 158 is normally closed at low rotative speed (i.e. 30 miles per hour and below) and the switch 160 is normally open at low rotative speed (i.e. 40 miles per hour and below). In operation, as the vehicle speed increases, the governor actuates the switch 158 at the desired speed to open the second solenoid actuating circuit 122 to thereby de-energize that circuit at and above expressway speeds as was described in an embodiment of FIGURE 1. As the speed continues to increase, the switch 160 is closed thereby closing the lockout switch de-activating circuit 142 for the purpose of releasing the pull rod 38, if necessary, as was described in a description of the pull rod mechanism of FIGURE 1 above. Obviously, the particular speeds at which the switches open and close can be adjusted as desired so that, not only may the speeds at which they actuate be fixed for particular conditions but, the speed span between their actuation may be varied as desired.

What has been set forth above is intended as exemplary to aid those skilled in the art in the practice of the invention. It should therefore, be understood that, wihin the scope of the appended claims, the invention may be practiced otherwise than as specifically described.

What is new and desired to be protected by Letters Patent of the United States is:

1. In a vehicle having a braking system, a braking signal circuit and a brake actuated switch to energize the circuit on braking of the vehicle, the improvement comprising brake switch bypass means also energized by the brake switch, means including vehicle speed-condition-operated switch to maintain said brake switch bypass means and thereby the signal circuit energized while the vehicle speed condition is below a predetermined level after the vehicle has been braked.

2. In a vehicle having a braking system, a braking signal circuit and brake-actuated switch to energize the circuit on braking of the vehicle, the improvement comprising brake switch bypass means also energized by the brake switch, holding means including a vehicle speed-condition-operated switch to maintain said brake switch bypass means and thereby the signal circuit energized while the vehicle speed condition is below a predetermined level after the vehicle has been braked, and a manually operated switch to selectively deactivate said holding means.

3. In a vehicle having a braking system, a braking signal circuit and a brake-actuated switch to energize the circuit on braking of the vehicle, the improvement comprising means including a vehicle speed-condition-operated switch in a circuit bypassing said brake-actuated switch to maintain said circuit energized while the vehicle speed condition is below a predetermined level after the vehicle has been braked, a manually operated switch to selectively open the bypass circuit to deactivate the operation thereof, and means including a second speed-condition-operated switch to close said manually operated switch when the vehicle speed condition exceeds a predetermined level.

4. A signal device for vehicles having a brake system thereto comprising an electric circuit including a source of electrical energy, a signal light system at the rear of the vehicle interposed in said circuit, a normally open brake-actuated switch to close said circuit when pressure is applied to the brake and to open said circuit when pressure is released from the brakes;

a conductor connected in parallel to said circuit to bypass said switch, a normally open switch in said conductor, a solenoid operating said normally open switch;

a first solenoid-actuating circuit connecting said solenoid to said circuit in parallel to actuate said solenoid and close said normally opened switch when pressure is applied to the brakes;

a second solenoid actuating circuit connecting said solenoid to said source of energy, a second normally open switch in said second circuit connected to said solenoid for actuation thereby, a vehicle speed conditon actuated switch means in said second circuit to open said second circuit when the speed conditions of the vehicle are above a predetermined level for deactivation thereof at speed conditions above that level.

5. A signal system in accordance with claim 4 wherein said vehicle speed-condition-actuated switch means includes a speedometer, an arcuate contact disposed on said speedometer in an area thereon corresponding to speeds below a predetermined level and connected to one side of said second solenoid-actuating circuit, a brush disposed on the indicator of said speedometer disposed to sweep said contact when the indicator is in the range of speed equivalent to the span thereof, said brush connected to the other side of said second solenoid-actuating circuit.

6. A signal device in accordance with claim 4 wherein said vehicle speed-condition-actuated switch means comprises a centrifugal governor device connected to the vehicle propelling system for rotation thereof and a switch in said second circuit actuated by said device to open above a vehicle speed of a predetermined level.

7. A signal device in accordance with claim 4 wherein a manually operated, normally closed switch is further provided in said second circuit for selective denergization thereof.

8. A signal device in accordance with claim 7 wherein said manually operated switch is biased in the closed condition and means are provided to normally block closure thereof after said switch has been opened, a second means including a vehicle speed-condition-actuated switch to actuate said means to block and unblock said manually operated switch when the vehicle speed condition is above a predetermined level.

9. A signal device for vehicles having a brake system thereto comprising an electric circuit including a source of electrical energy, a signal light system at the rear of the vehicle interposed in said circuit, a normally open brake-actuated switch to close said circuit when pressure is applied to the brakes and to open said circuit when pressure is released from the brakes;

a conductor connected in parallel to said circuit to bypass said switch, a normally open switch in said conductor, a solenoid operating said normally open switch;

a first solenoid-actuating circuit connecting said solenoid to said circuit in parallel to actuate said solenoid and close said normally opened switch when pressure is applied to the brakes;

a second solenoid actuating circuit connecting said solenoid to said source of energy, a second normally open switch in said second circuit connected to said solenoid for actuating thereby, a vehicle speed-condition-actuated switch means in said second circuit to open said second circuit when the speed conditions of the vehicle are above a predetermined level for deactivation thereof at speed conditions above that level;

a manually operated normally closed switch including an operator in said second circuit;

a third solenoid-actuating circuit connected to said source of energy, a second solenoid interposed in said third circuit, a blocking member actuated by said second solenoid and biased to normally block said operator and restrain closure of said manually operated switch on opening thereof, a normally open switch in said third solenoid actuating circuit connected to said operator for closure thereof when said manually operated switch is opened, and a second vehicle speed-condition-actuated switch means in said third solenoid, actuating circuit to provide closure thereof when the vehicle speed condition exceeds a predetermined level for actuation of said second solenoid to unblock said operator and closure of said manually operated switch.

10. A signal system in accordance with claim 9 wherein said vehicle speed-condition-actuated switch means includes a speedometer, an arcuate contact disposed on said speedometer in an area thereon corresponding to speeds below a predetermined level and connected to one side of said second solenoid-actuating circuit, a brush disposed on the indicator of said speedometer disposed to sweep said contact when the indicator is in the range of speed equivalent to the span thereof, said brush connected to the other side of said second solenoid-actuating circuit.

11. A signal device in accordance with claim 10 wherein said second vehicle speed-condition-actuated switch comprises a second arcuate contact disposed on said speedometer in an area thereon corresponding to speeds above a predetermined level, a second brush on the indicator of said speedometer disposed to sweep said second contact when said indicator is in the range of speeds corresponding to the span thereof.

12. A signal device in accordance with claim 9 wherein said vehicle speed-condition-actuated switch means comprises a centrifugal governor device connected to the vehicle propelling system for rotation thereof and a switch in said second circuit actuated by said device to open above a vehicle speed of a predetermined level.

13. A signal system in accordance with claim 12 wherein said second vehicle speed-condition-actuated switch means comprises a second switch in said third circuit actuated by said device to open below a vehicle speed of a predetermined level.

References Cited

UNITED STATES PATENTS

| | | | |
|---|---|---|---|
| 2,832,864 | 4/1958 | Rapp | 340—71 X |
| 2,945,209 | 7/1960 | Berg | 340—71 |

NEIL C. READ, *Primary Examiner.*

A. WARING, *Assistant Examiner.*